(12) United States Patent
Holden

(10) Patent No.: US 8,307,390 B2
(45) Date of Patent: Nov. 6, 2012

(54) RE-ADDRESSABLE ALTERNATE CONTENT

(75) Inventor: Dan Holden, Littleton, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 12/862,716

(22) Filed: Aug. 24, 2010

(65) Prior Publication Data

US 2010/0325660 A1    Dec. 23, 2010

Related U.S. Application Data

(63) Continuation-in-part of application No. 12/393,277, filed on Feb. 26, 2009.

(51) Int. Cl.
*H04N 7/10* (2006.01)

(52) U.S. Cl. .......... 725/34; 725/42; 725/52; 725/60

(58) Field of Classification Search .......... None
See application file for complete search history.

(56) References Cited

U.S. PATENT DOCUMENTS

| | | | |
|---|---|---|---|
| 6,330,665 B1 | 12/2001 | Wise et al. | |
| 6,637,032 B1 | 10/2003 | Feinleib | |
| 6,871,006 B1 | 3/2005 | Oguz et al. | |
| 6,970,641 B1 | 11/2005 | Pierre et al. | |
| 7,017,173 B1* | 3/2006 | Armstrong et al. | 725/87 |
| 7,073,189 B2 | 7/2006 | McElhatten et al. | |
| 7,114,173 B2 | 9/2006 | Urdang et al. | |
| 7,231,132 B1 | 6/2007 | Davenport | |
| 7,274,857 B2 | 9/2007 | Nallur et al. | |
| 7,280,156 B2 | 10/2007 | Roelens | |
| 7,293,278 B2 | 11/2007 | Michel | |
| 7,317,797 B2 | 1/2008 | Vince | |
| 7,317,866 B1 | 1/2008 | Adolph et al. | |
| 7,330,640 B2 | 2/2008 | Schultz et al. | |
| 7,334,251 B2 | 2/2008 | Rodriguez et al. | |
| 7,379,656 B2 | 5/2008 | Lin et al. | |
| 7,383,565 B1 | 6/2008 | Fakharzadeh | |
| 7,412,149 B2 | 8/2008 | Cohen et al. | |
| 7,720,432 B1 | 5/2010 | Colby et al. | |
| 2002/0144262 A1* | 10/2002 | Plotnick et al. | 725/32 |
| 2003/0154128 A1* | 8/2003 | Liga et al. | 705/14 |
| 2004/0034874 A1* | 2/2004 | Hord et al. | 725/136 |
| 2004/0133909 A1* | 7/2004 | Ma | 725/34 |
| 2006/0080167 A1 | 4/2006 | Chen | |
| 2006/0218602 A1* | 9/2006 | Sherer et al. | 725/88 |
| 2008/0040740 A1 | 2/2008 | Plotnick et al. | |
| 2008/0155585 A1* | 6/2008 | Craner et al. | 725/32 |

(Continued)

OTHER PUBLICATIONS

European Search Report for EP10154144 dated May 7, 2010.

(Continued)

*Primary Examiner* — Vivek Srivastava
*Assistant Examiner* — Junior Mendoza
(74) *Attorney, Agent, or Firm* — Banner & Witcoff, Ltd

(57) ABSTRACT

Providing re-addressable alternate video content to consumers during trickplay modes of operation. For example, providing first video content for standard playback to a consumer; receiving a first consumer request for a first trick mode operation during the standard playback of the first video content; responsive to the first consumer request, providing addressable second video content, different from the first video content, to the consumer; receiving, during providing of the addressable second video content, a second consumer request for a second trick mode operation on the addressable second video content; and responsive to the second consumer request, providing addressable third video content, different from the first and second video contents, to the consumer.

18 Claims, 10 Drawing Sheets

U.S. PATENT DOCUMENTS

| | | | | |
|---|---|---|---|---|
| 2008/0304809 | A1* | 12/2008 | Haberman | 386/68 |
| 2009/0031419 | A1 | 1/2009 | Laksono | |
| 2009/0150966 | A1 | 6/2009 | Alao et al. | |
| 2009/0244371 | A1 | 10/2009 | Park | |
| 2010/0077435 | A1* | 3/2010 | Kandekar et al. | 725/61 |
| 2010/0251288 | A1* | 9/2010 | Carlucci et al. | 725/32 |
| 2011/0289531 | A1* | 11/2011 | Moonka et al. | 725/38 |

OTHER PUBLICATIONS

"MGNA Global Updates On-Demand Forecasts", Radio Business Report/Television Business Report—Voice of the Broadcasting Industry, pp. 1-3, <http://www.rbr.com/media-news/advertising/magna_global_updates_on-demand_forecasts.html>, printed Feb. 12, 2009.

"King of Beers Defies TiVo Timeshifting", Television Broadcast magazine, Jan. 2008, pp. 1-2, <http://www.televisionbroadcast.com/article/73266>, printed Feb. 12, 2009.

"Study: DVR Ratings Impact Rises", Steve McClellan, Adweek, Nov. 6, 2008, pp. 1-2, <http://www.adweek.com/aw/content_display/news/agency/e3i3def5863518ec8fbe78bc3264662ca35>, printed Feb. 12, 2009.

"Report: More Than Half of $100K Households Time Shift", by Anthony Crupi, Mediaweek, Jan. 8, 2009, pp. 1-2, <http://www.mediaweek.com/mw/content_display/news/media-agencies-research/e3i41ac0111ebdf301046d725505e8812e5, printed Feb. 12, 2009.

"Fox Goes Sci-Fi to Measure 'Fringe' Ad Effectiveness", by Jon Lafayette, TVWeek, Sep. 7, 2008, pp. 1-4, <http://www.tvweek.com/news/2008/09/fix_goes_scifi_to_measure_frin.php>, printed Feb. 12, 2009.

"Trick-File Advertising," by Dan Holden, presentation at NCTA 2009, Mar. 2009.

"Targeted Advertising: Cable Show Tech Session Review," CABLE 360 NET, www.cablefax.com, Apr. 6, 2009.

"Cable Show 2009: Sending the Right Message," Multichannel News, www.multichannel.com, Apr. 1, 2009.

Communication in EP10154144.9 dated Jun. 1, 2011.

* cited by examiner

RE-ADDRESSABLE ALTERNATE CONTENT

CROSS-REFERENCE TO RELATED APPLICATIONS

The present application is a continuation-in-part of U.S. patent application Ser. No. 12/393,277, filed Feb. 26, 2009, and entitled "Method and Apparatus for Generating Alternative Commercials," which is hereby incorporated by reference as to its entirety.

BACKGROUND

When individuals watch or listen to prerecorded media content on a television, computer, CD player, etc., such as when viewing a DVD, a videocassette, video on demand (VOD), material recorded on a digital video recorder (DVR), they often skip over portions of the content of the media in which they are not interested.

In connection with digitally recorded media, such as media recorded on a DVR, DVD, CD, or streaming VOD, the media player devices (e.g., CD players, DVD players, DVRs, and network VOD servers) are designed to provide trick modes of operation, such as fast-forward and rewind.

When media is recorded in an analog fashion, such as on an audio or video tape, fast-forwarding, for instance, merely involves moving the tape past the playback heads at a faster speed than normal playback. This will cause the sound and/or video to become highly distorted from the individual's perspective, but still provides enough clarity to decipher the content that is being fast-forwarded through so that the individual can determine when to stop the tape and resume normal playback.

However, in connection with digital media, simply outputting the digital data at a faster rate than during normal playback is not a practical option insofar as the output to the monitoring device would not be perceivable by the individual in any way that would allow the individual to determine the media content that is being fast-forwarded or rewinded through. Rather, the fast-forwarding or rewinding usually requires the use of techniques, commonly termed "trick modes," to achieve a similar effect from the individual's perspective to that of fast-forwarding or rewinding through an analog tape. More particularly, in order for the functions of fast-forward and rewind to be reasonably user friendly, the user must be provided some feedback from the media enabling the user to discern the media content that is being fast-forwarded or rewinded through. Otherwise, the individual would have no idea when to stop fast-forwarding or rewinding in order to view the content that the individual does wish to view.

Accordingly, in response to selection of a trick-mode, such as fast-forward, super fast-forward, rewind, pause, slow play, etc., digital media playback devices, such as CD players, VCRs, DVD players, and video-on-demand (VOD) servers are designed to enter a trick mode of operation. For instance, for fast-forward operation, the device may selectively output pieces of the content in a humanly perceptible form so as to provide an experience to the individual similar to that of fast-forwarding or rewinding through an analog tape so that the individual can perceive the media content, albeit typically in a very distorted fashion, but sufficiently clearly to obtain a general idea of the content that is being fast-forwarded or rewound through.

For instance, in a simple form, this might comprise displaying still images selected from the content at one second intervals (e.g., I-Frames in an MPEG data stream) for ¼ of a second to provide a fast-forward function at a rate of four times the normal playback speed. The fast-forward speed could be doubled to eight times normal playback by displaying for ¼ second a still image taken at two second intervals or, alternately, by displaying the still image for $1/8^{th}$ of a second instead of a $1/8^{th}$ of a second and keeping the interval between images the same at one second.

One of the more common types of content that individuals tend to skip over are commercials or advertisements. Perhaps the most ubiquitous situation in which this occurs is when individuals record television programs on their DVRs and during the viewing of VOD offerings (as are now commonly available on many subscription-based television service networks, e.g., cable television networks, satellite television networks, and fiber optic television networks). Fast-forwarding through commercials and other content, however, also is common in connection with media content recorded on other media, such as videocassettes, DVDs, content recorded onto a hard disk such as the hard disk of a personal computer (PC), and even streaming video over the Internet or other information network.

The phenomenon of fast-forwarding through commercials and other content is most commonly associated with multimedia content, and particularly television content, but certainly occurs with other types of media content, such as audio content, including, recorded radio programs, podcasts, and other audio content recorded on hard drives, solid-state memory, audio cassette tapes, CDs, DVDs, etc.

Since the fees paid by advertisers for the right to place their advertisements within media content are a substantial source of revenue for media content providers, the proclivity of viewers to fast-forward through commercials is a significant problem for advertisers and content providers alike.

SUMMARY

The features herein include methods, systems and apparatus for providing alternate content to consumers of digital media during trick modes of operation. The alternate content may be addressable such that the alternate content depends upon one or more factors associated with the recipient customer of the alternate content. Such factors may include, for example, demographic characteristics of the recipient, historical choices made by the recipient whether to skip or watch previous alternate content provided to the recipient, and/or the identity of the presently-provided alternate content to be replaced.

In some embodiments, a system herein may respond to a user's trick mode command for a first content by providing a second piece of content, different from the first content. For example, the user may be watching a television program, and upon attempting to fast-forward through a commercial, the user may be provided with a second piece of content, such as another advertisement.

While that second piece of content is being provided to the user, further trick mode requests may be re-mapped to perform different functions. For example, pressing "Fast forward" while viewing the alternative advertisement may cause the display of a second screen of the alternative advertisement (such as another alternative advertisement or other content), instead of fast forwarding through the original first content. The alternative advertisement may include instructions to explain to the user how the trick mode commands are re-mapped during the display of the alternate advertisement. This replacement of the alternate content with new alternate content may be repeated as many times as desired. In other words, the recipient may use a re-mapped trickplay command to skip the alternate content, thereby resulting in a replacement alternate content. The recipient may then use a remapped trickplay command to skip the replacement alternate content, thereby resulting in yet another replacement alternate content, etc.

For example, if the recipient customer selects to fast forward through an addressable advertisement, the trick mode command will be captured and used to place a secondary alternate content opportunity. This new placement opportunity may be a simple swap of the primary spot for a secondary spot, or activation of a trick content file. Moreover, not only may the initial alternate content be addressable, but so may the secondary replacement alternate content, as well as any subsequent alternate contents. Thus, the alternate content provided to the recipient may be considered to be re-addressable.

Where the alternate content includes advertising, the creation of these additional alternate advertising opportunities may allow service providers to sell additional avails per advertisement placement opportunity. Studies have shown that customers will typically watch advertising they find compelling or of interest. If the customer selects to fast-forward through an advertisement, this is a clear indication that the customer is not interested in the specific advertisement. Accordingly, providing additional alternate advertising opportunities in this manner may automatically correct an advertising campaign for issues such as advertising burn-out.

In response to the user's initial or subsequent trick mode commands, the first content may still be displayed in a corresponding trick mode version, and the alternative content may be displayed as an overlay atop the first content or next to the first content. The overlay may still permit the user to see the at least a portion of the trick mode version of the first content, so, for example, the user can determine when to command the trick mode to end, (e.g., a command to stop fast-forwarding), such as when the commercial break ends. The overlay of alternative content may be a partial or full overlay, and may be a transparent or non-transparent overlay.

Accordingly, aspects as disclosed herein may be directed to, for example, a method, comprising: providing first video content for standard playback to a consumer; receiving a first consumer request for a first trick mode operation during the standard playback of the first video content; responsive to the first consumer request, providing addressable second video content, different from the first video content, to the consumer; receiving, during providing of the addressable second video content, a second consumer request for a second trick mode operation on the addressable second video content; and responsive to the second consumer request, providing addressable third video content, different from the first and second video contents, to the consumer.

Further example aspects may be directed to a method, comprising: responsive to a first request received while first video content is being provided in a data stream, splicing second video content, different from the first video content, into the data stream; responsive to a second request received while the second video content is being provided in the data stream, determining third video content, different from the first and second video contents, based on the second video content; and splicing the third video content into the data stream.

Still further example aspects may be directed to a method, comprising: responsive to a first request received while first video content is being provided in a data stream, splicing second video content, different from the first video content, into the data stream; responsive to a second request received while the second video content is being provided in the data stream, determining third video content, different from the first and second video contents, based on a stored history of video content that was previously skipped by a recipient of the data stream; and splicing the third video content into the data stream.

Systems and apparatuses for performing the above methods, for example, are also described, as well as computer-executable instructions (e.g., software) stored on computer-readable media for performing the methods.

These and other aspects will be described in connection with the drawings in the Detailed Description portion of this disclosure.

DETAILED DESCRIPTION

Figure 1:
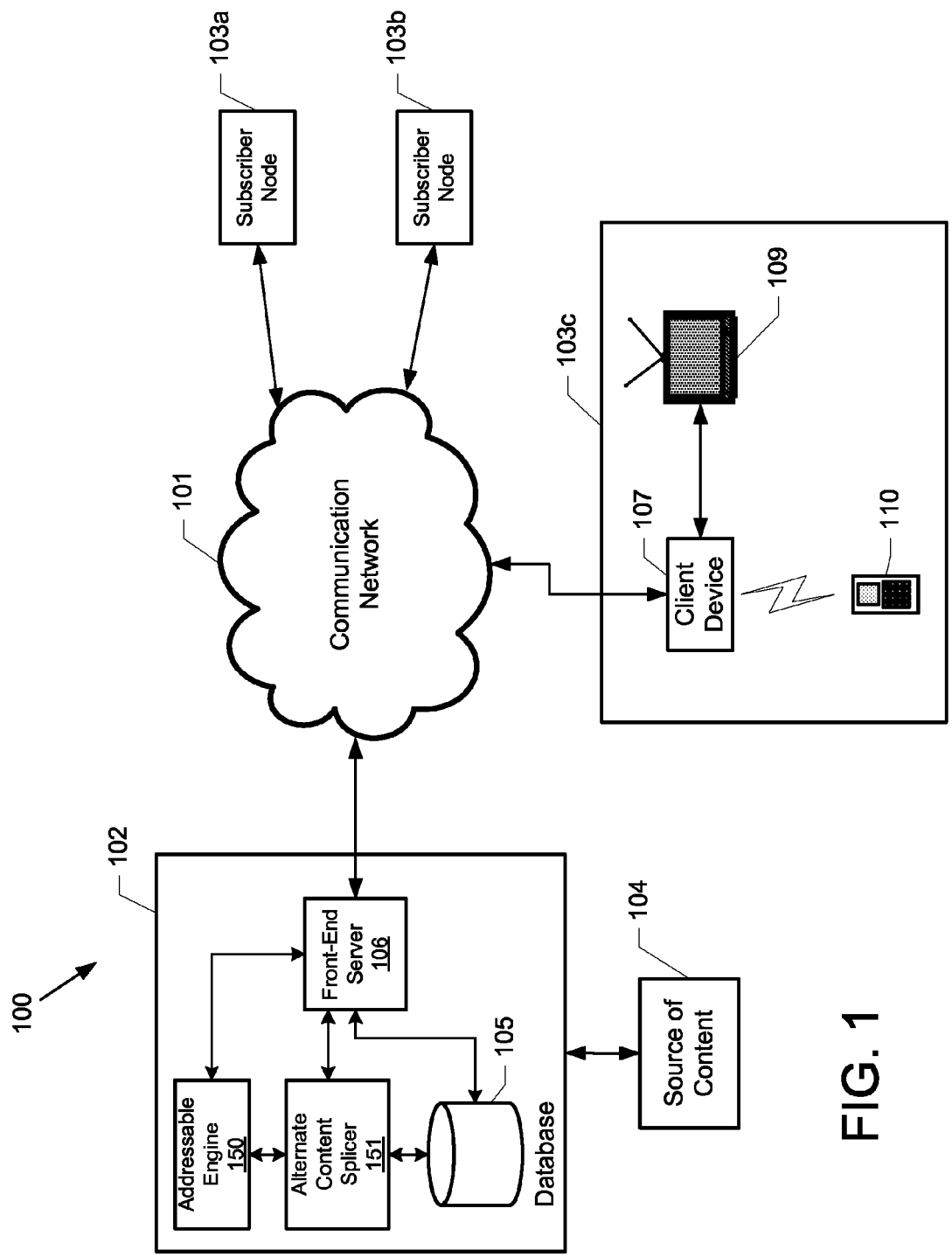
FIG. 1 illustrates an example system on which features described herein may be implemented.

The features herein include techniques, systems, apparatus, and methods for mapping trick modes of operation in connection with the playback of media content wherein the trick modes of operation are mapped to alternate advertising or other media content. The features will be described hereinbelow primarily in connection with an embodiment in a television service network, such as a cable television network. However, it should be understood that this is merely exemplary. The features may be implemented in connection with any form of media content, including audio content, video content, and multimedia content, and in connection with any number of delivery mechanisms for such content, including television networks, media delivered via the Internet or another information network, media stored on any digital medium, including, but not limited to, DVDs, CDs, solid-state memory, and hard disk drives such as found in computers and DVRs.

As noted above, any mode of operation of a digital media player device other than standard playback may be known as a trick mode of operation. Trick modes of operation, for instance, include, pause, fast-forward, double fast-forward, triple fast-forward, quadruple fast-forward, rewind, double rewind, triple rewind, quadruple rewind, slow playback, slow rewind, and frame advance. "Start Over" is a relatively new trick mode now offered by some television network providers in which, when a tuner tunes in to a particular program after the program has started, the user may select a "Start Over" option to cause the program to start over from the beginning.

As noted above, a substantial source of revenue in the media production and delivery industries is payment for advertising space within media. This includes, for instance, commercials aired before, after, or in the middle of television programs, advertisements before, after, or in the middle of media delivered via the Internet or other information networks, advertisements placed on recorded media offered directly to, and purchasable by, consumers, such as DVDs and CDs, and advertisements placed within podcasts, etc.

In theory, the advertiser is paying the media content provider for the right to place its advertisement within the media based on the assumption that the consumers who consume the media will view (or hear) the advertisement. However, this often is not the case because most media player devices include trick modes of operation, such as fast-forward, that allow media consumers to essentially skip over the advertisement and, therefore, consumers frequently do exactly that.

This phenomenon therefore leads to a reduction in the value of advertising placed within recorded media.

The features herein offer a technique for increasing the value of advertisements placed within media content by providing a method and apparatus by which an advertisement still can be delivered to the consumer during trick mode operations such as fast-forward. Particularly, as noted above, most digital media players, when a trick mode of operation is selected, output a trick file.

As noted above, in the example of fast-forward, the trick file may comprise I-frames in an MPEG data stream taken at one second intervals and displayed every $\frac{1}{4}^{th}$ of a second.

There are several ways to provide such trick mode functionality and different media player devices may use different such techniques. For instance, in one such technique commonly used in connection with VOD servers, the actual media content, e.g., a television program, is stored on the network both in its standard format, e.g., a standard MPEG file, and in the one or more trick files. For instance, there may be a different trick file for each different trick mode of operation. Thus, for instance, continuing the example above in which selection of a fast-forward trick mode results in the playing of I-frames at one second intervals for $\frac{1}{4}^{th}$ of a second, the trick file associated with the original standard MPEG file may be another MPEG file containing the content of the I-frames separated by one second intervals within the original MPEG file displayed for $\frac{1}{4}^{th}$ second each. Thus, when a consumer watching a program via VOD selects fast-forward, the selection of fast-forward is mapped to the corresponding portion of this trick file so that the VOD server delivers to that consumer the appropriate portion of that trick file, rather than the original standard MPEG file.

In other systems, the trick file is not necessarily created and stored in advance. In one such system, the trick file is created on the fly when the trick mode is selected.

Instead of playing a conventional trick file containing pieces of the content of the original file in response to selection of a trick mode, a trick file containing an alternate advertisement may be played. The illusion of fast-forwarding through the original file can be preserved by, for instance, making the advertisement file much shorter than the portion of the original content that the consumer is fast-forwarding through. For instance, if an advertiser has purchased a 30 second advertising avail during a television program, the fast forward trick file can present a five second advertisement in its place.

Presumably, although not necessarily, in a practical embodiment, the advertiser that purchased the 30 second avail within the original program content also is given the rights to place alternate advertising in the temporally corresponding portion of the trick file(s). The content provider may charge the advertiser an extra fee to play the alternate advertising during fast-forward operation. Alternately, the content provider may offer the alternate advertising avail free of charge as part of the purchase of the original 30 second avail. In some embodiments, a different alternative advertising trick file may be provided for each different possible trick mode, e.g., fast-forward, double fast-forward, triple fast-forward, rewind, pause, etc. The advertiser may choose to purchase or provide alternate advertising avails during all available trick modes of operation or may choose to purchase alternate advertising spots connection with only some or none of the trick modes of operation. A different alternate advertisement may be provided for each different trick mode. Alternatively, some trick modes may re-use the same alternate advertisements, particularly trick modes having similar "speeds" through the original content (e.g., double fast forward and double rewind). On the other hand, the same advertisement, e.g. a still image advertisement, may be used in any number of different trick modes regardless of "speed" relative to the original content, such as pause, fast forward, double fast forward, etc.

If the advertiser chooses not to take advantage of trick mode alternate advertising in one or more of the trick modes, then more conventional trick mode file content may be generated for those portions of the original file. In other embodiments, however, the content provider may sell those trick mode advertising avails to other advertisers.

In order to best preserve the illusion of fast-forwarding through the material, the advertisement may consume only a portion of the display area, e.g., the center, while the area around the edges of the advertisement appears to be the original content playing at a fast-forward speed. In other embodiments, the alternate trick file advertisements may be slightly transparent with a background that appears to be the original content playing at a fast-forward speed behind the alternate advertisement.

The alternate advertisements may take any number of forms, including, a still image, an ultrashort commercial (like a standard commercial, but very short in duration) or a "speed bump." Speed bump refers to a trick file comprising at its beginning and its end content similar to that of a conventional trick file such as content that makes it appear that the underlying original programming is passing by at a fast pace. However, in the middle, it comprises an advertisement (e.g., a still image for one second).

In accordance with one particular embodiment, the alternate advertising trick file can be configured to tempt the consumer to take further actions. For instance, the alternate advertising may tempt the consumer to operate the media player device in a sequence of trick modes of operation (during each of which, a different advertisement, portion of an advertisement, or prize may be displayed). This can be done in the nature of a game with a prize at the end. For instance, when a user selects fast-forward during a conventional advertisement, an alternate advertisement may be displayed such as any of those described above, but further including instructions to use another trick mode, e.g., double fast rewind, in order to win a prize or see a preview for an upcoming movie or television program. Then, when the user selects double rewind, the user is presented with another trick file, including the aforementioned movie preview or a printable coupon or instructions to visit a website and input a certain code to receive a coupon or an interactive television experience, possibly including the opportunity to purchase merchandise directly online. Alternately, when the consumer selects double rewind, the consumer may be presented with another advertisement that includes an instruction to select yet another trick mode in order to receive some benefit such as a prize or another preview or the second half of the same preview. The possibilities are endless.

In addition to associating a trick mode of operation with an interactive television experience, it is also possible to use the alternate advertising trick files in connection with addressable advertising, that is, advertisements that are individually addressed to specific consumers (as oppose to conventional advertisements that are broadcast to anyone viewing a given program). More particularly, many commercial-based information networks, such as cable television networks, have or are developing technologies that enable the delivery of different advertisements simultaneously to different consumers viewing the same underlying television program. For instance, a household within a neighborhood having an average home sale price above a certain threshold might receive a commercial for a BMW automobile, whereas another household within a neighborhood with lower average residential real estate prices may receive a different commercial for a Kia automobile. The alternate advertising received when a trick mode of operation is activated also may be different depending on the specific consumer or consumer demographic profile.

The use of alternate advertising trick files is not limited to presenting the alternate advertising only during the portions of corresponding to advertising content in the original media file. It is possible to provide alternate advertising content to consumers when they are fast-forwarding (or using other trick modes of operation) through non-advertising program content. Again, it usually can be assumed that the consumer is not interested in any underlying original content that the consumer is traversing via certain trick modes of operation such as fast-forward and rewind. Hence, such instances may provide even more advertising opportunities.

Furthermore, it should be understood that the alternate content need not even comprise advertising, but can be any content that is different from the content of the underlying standard file content. That is, a conventional trick file essentially comprises a subset of the standard file to which it corresponds (e.g., a subset of the I frames). The alternate content may replace or supplement the content of a conventional trick file with other content perceivable and, hopefully, of interest to the consumer. It need not be advertising per se.

As noted above, it will usually be desirable to provide some humanly perceivable indication of position within the original content so as to enable the consumer to determine when he or she wishes to return to standard playback mode. This can be accomplished in any of the ways discussed herein above, such as presenting the advertisement only in the middle of the monitor screen with the underlying program content visible around the edges of the advertisement or by making the advertising content partially transparent.

The alternate advertising may comprise content only in one track of the media stream. For instance, during fast-forward, the video stream portion of the media stream may comprise a conventional fast-forward trick file, while only the audio stream comprises advertising content.

In one example, the features herein may be implemented in connection with video on demand (VOD) servers within television service networks, such as cable television networks, by mapping trick modes to trick files containing alternate advertising instead of conventional trick mode files. The features also can be implemented in connection with DVDs, CDs, and other digital recorded media directly purchased by consumers by providing trick files on the DVD, CD, etc. and mapping trick modes of operation to those files. Furthermore, in connection with network-connected DVRs, trick files with alternate advertising may be downloaded and stored to the DVR ahead of time. This can be done behind the scenes without the user's knowledge. For instance, alternate advertising trick files can be downloaded using a second or third alternate tuner in a DVR. Alternately, such advertising trick files can be downloaded to the DVR when the DVR is "off". In other embodiments, alternate trick files can be downloaded at a certain time of day during which the consumer is unlikely to be watching television.

Alternately, if the network fabric is fast enough, the trick file advertisements need not necessarily be downloaded to the DVR ahead of time, but can be pulled off a network server at the time of selection of the trick mode.

FIG. 1 is a diagram of a television service network 100, such as a cable television network, within which the features herein may be implemented. Generally, the network comprises suitable switching and transport fabric 101 (e.g., a communication network linked by coaxial cable, fiber, hybrid-fiber-coaxial cable, satellite link, etc) for providing two way communication between various nodes on the network, including server nodes, such as a head end 102, and client nodes 103a-c, such as consumer set top boxes. These nodes may all be implemented using computer hardware, such as processors and computer-readable memory (e.g., hard drive, compact disk, FLASH RAM, etc.) storing computer-executable instructions for performing the various features described herein. Often, content is downloaded to a head end node 102 from or via one or more other server-side nodes 104 further upstream in the delivery path, such as a NCC (National Content Center) node.

In this example, the head end node 102 includes memory storing a database 105 containing, among other things, video on demand (VOD) selections that are available to subscribers with proper authorization to have transmitted to them at a time of their choosing, and/or an advertising (and/or other alternate content) inventory. The head end 102 further comprises a front end server 106 for sending both video on demand selections as well as broadcast television programs onto the network 101 to the various subscriber nodes 103a-c. The head end 102 further comprises an addressable engine 150 and an alternate content splicer 151. The client nodes may comprise consumer nodes, which may be located in residences or businesses, and/or may comprise mobile devices. Node 103c illustrates some detail of one particular consumer node typical of a residential consumer node. The node comprises a client device 107 for receiving content, such as a gateway, set-top box (STB), or other device designed for communication with the network 101.

Referring to the present example, client device 107 can receive, demodulate and demultiplex television signals and provide the content on a single selected channel to a monitor 109, such as a connected television set. Client device 107 in this example has a built in DVR including a memory, such as a hard drive, for recording television programs. Client device 107 also can transmit signals and data upstream on the network 101 in order to send commands and requests to the head end 102, such as a request for delivery of a particular video on demand program. Typically, a user interfaces with the client device 107 via a wireless remote control unit 110. The remote control unit 110 commonly has a plurality of buttons to select, among other things, trick modes of operation for video on demand content and recorded content during playback from the memory of the DVR.

Figure 2:
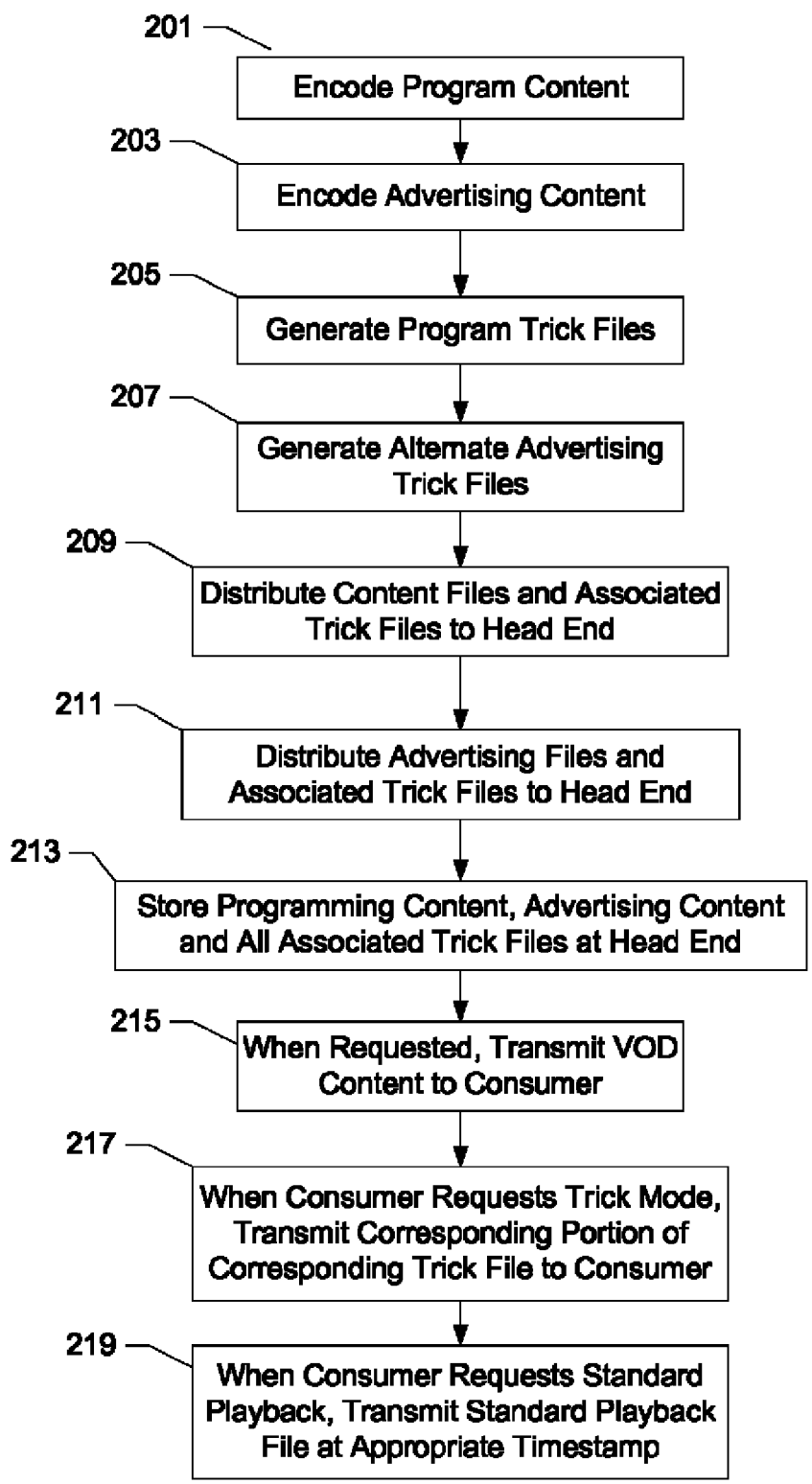
FIG. 2 illustrates an example process of trick mode advertising.

FIG. 2 is a diagram illustrating operation in accordance with one embodiment. Again, we shall consider an example in connection with playback of video-on-demand content from a server-side node within a cable television network. However, again, this is merely exemplary. The features herein are not limited to television programming, television networks, VOD, or even video content, but are applicable to any type of media content, including, but not limited to, audio content, video content, and multimedia content. It also may be implemented in connection with any delivery mechanism, including, but not limited to, television service networks, the Internet, CDs, DVDs, podcasts, etc.

As will be seen in the flow diagram and as is typical in connection with television content, the program content is generated and delivered to a head end separately from the advertising content. Encoded program content as well as encoded advertising content may be delivered to one or more computers at a file generation center (steps 201 and 203). For an MSO (multi-system operator), this may be a national content center from which it distributes all of its content to regional content centers and therefrom to individual head ends. In any event, conventional trick files may be generated for the programming content (step 205). Likewise, alternate advertising trick files may be generated containing alternate advertising content (step 207). A different alternate advertising trick file may be provided for each possible trick mode of operation, or may be provided for less than all trick modes of operation. If alternate advertising trick files are not provided for some trick modes, then conventional trick files can be created for those modes of operation. A trick-file may be the video a consumer experiences when they activate a trick mode, e.g. fast forward. When a conventional fast-forward trick-file video is streamed, for instance, it gives the illusion of a VCR running in faster than normal mode. One method for the creation of a trick-file is to extract all I-Frames then create a new file comprised of fewer frames than the original video. For instance, a thirty second spot encoded to VOD specifications would contain exactly 900 frames of video. In order to play the spot in five seconds, 750 frames of video would be removed in order to reach a total frame count of 150.

There are several methods for generating VOD trick file displays: files, indexes, and dynamic video generation. One method, the "file" method, creates a new trick file (video file) that is played when a trick mode is activated. A second method, the "indexing" method, is a similar approach. However, rather than creating a new video file, indexes are assigned to frames of the original video. These indexes are utilized by the video pump to select the correct frames to display in order to achieve a fast forward effect. A third method, "dynamic video generation," does not necessarily generate a new file prior to the trick play request, and instead dynamically calculates how many frames to skip in real-time as the original video is played during the trick mode.

In any event, the original content as well as the corresponding trick files may be distributed to one or more computers at a content center such as a head end (step 209). Likewise, the conventional advertising files as well as the alternate advertising trick files also may be delivered to the one or more computers at a content center such as a head end (step 211). The content center stores the programming content, advertising content, and all of the corresponding trick files (step 213).

When a consumer at a client-side node, such as an STB, PC, cell phone, or other media play device selects to view a particular VOD selection, a VOD server transmits the corresponding content to the consumer's device (step 215). If the consumer selects a trick mode of operation during playing the VOD selection, the VOD server ceases transmission of the standard media content file and starts transmitting the corresponding portion (in terms of time stamp) of the trick file corresponding to the selected trick mode (step 217). For example, if the user chose to fast-forward at 4× speed, the 4× speed trick file for the program may be transmitted. When the consumer selects standard playback mode again, the VOD server ceases transmission of the trick file and commences transmission of the standard file again at the appropriate time stamp (step 219).

Figure 3A:
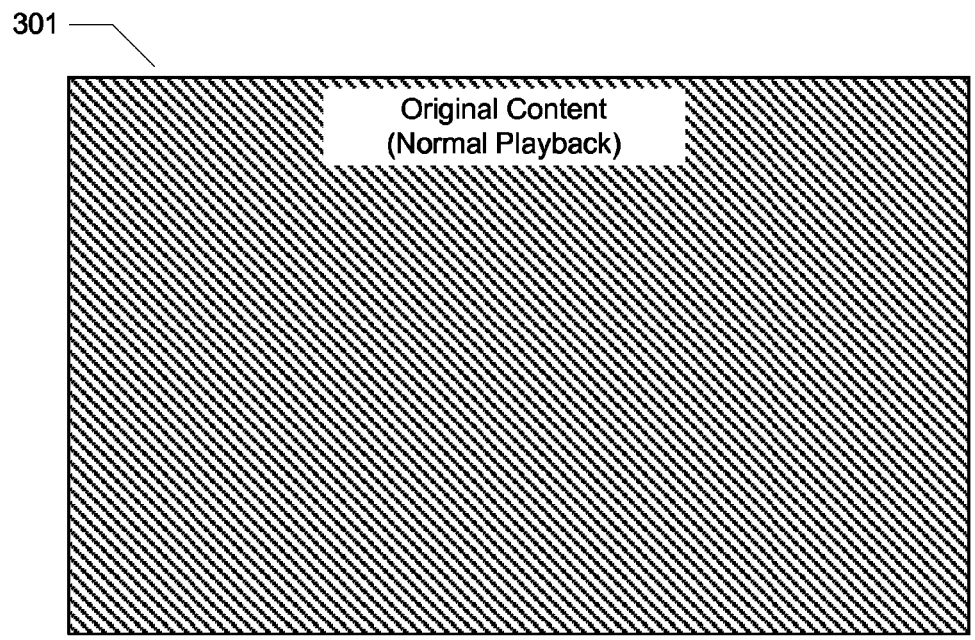
FIGS. 3a-d illustrate example screen displays employing various trick mode advertisement features described herein.
Figure 3B:
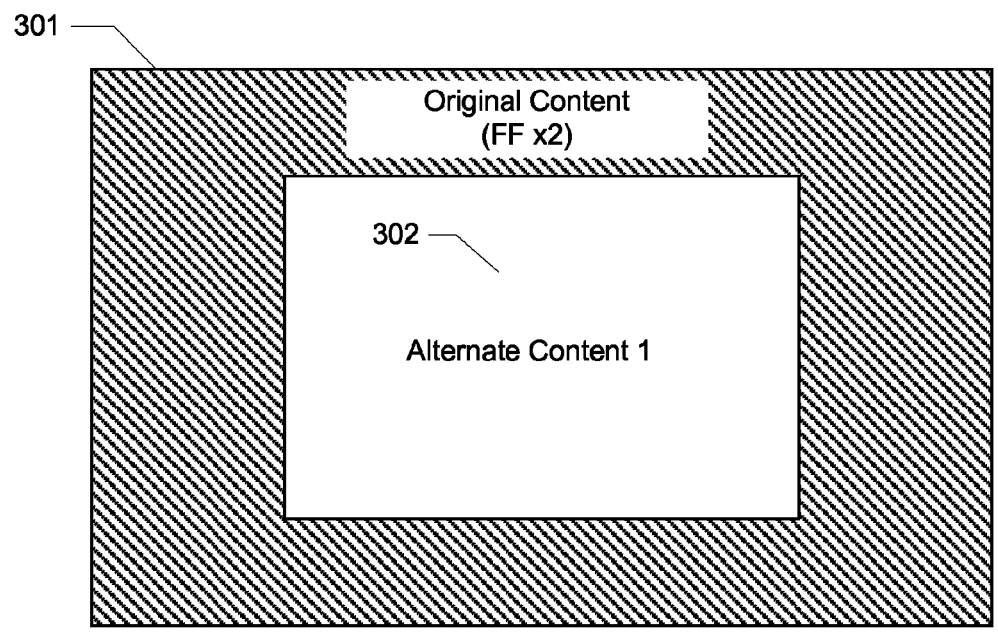
Figure 3C:
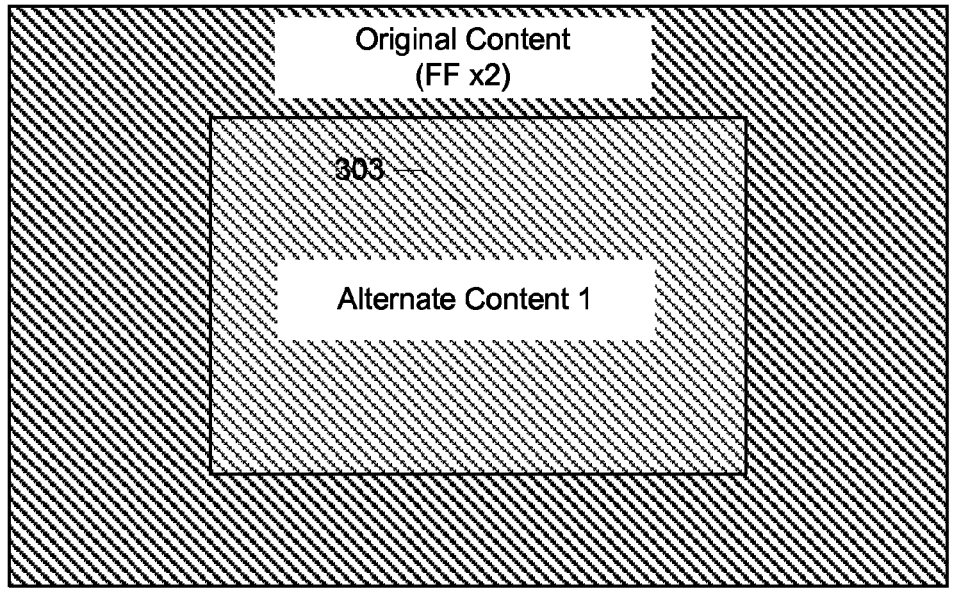
Figure 3D:
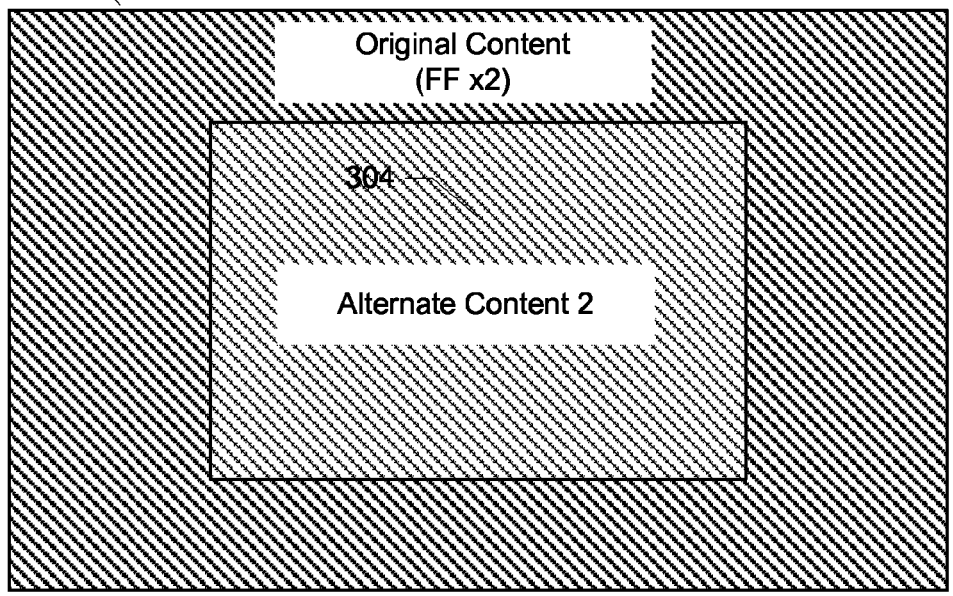
Figure 4A:
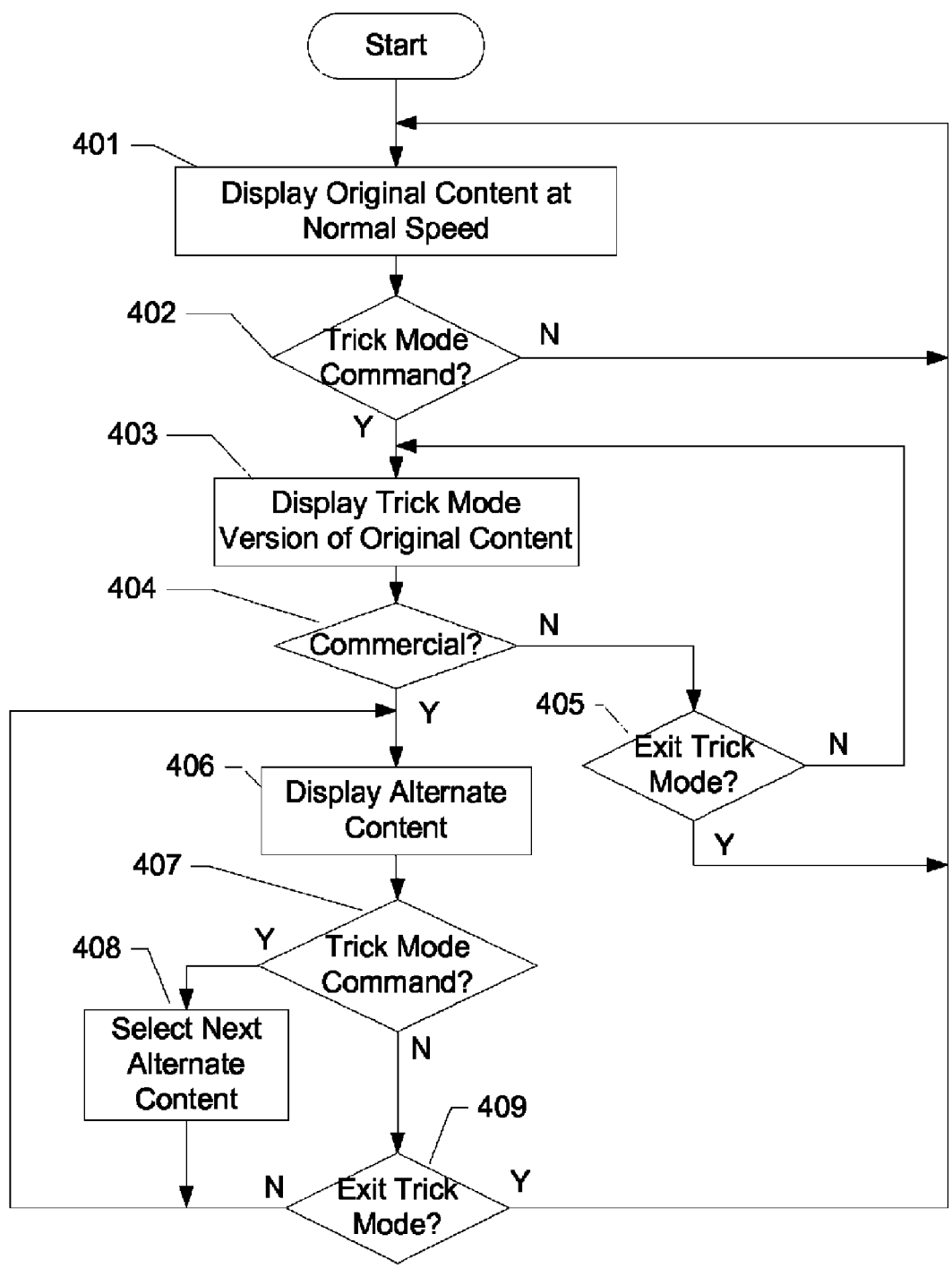
FIGS. 4a and 4b illustrate example processes of trick mode advertising, in conjunction with the screens in FIGS. 3a-d.

FIGS. 3*a*-*d* illustrate example display screens that can be presented to the user, and FIG. 4*a* illustrates an example process in which these screens may appear. These will be described together, following the FIG. 4*a* process. The process steps may be performed by a computer processor system at a source of content (e.g., at a cable headend, or a user's media playback device (CD player, set-top box, DVD player, etc.)) In step 401, the system may begin by displaying original content at normal playback speed to a user. This may occur, for example, when a user requests a particular program using a set-top-box, or presses a "Play" button on a DVD player. The screen may appear as shown in FIG. 3*a*, with original content 301 being displayed at normal playback speed.

In step 402, the system may check to determine whether the user has entered a trick play command. The trick play command may be any request to alter the playback operation of the original content. For example, the trick play command may be a fast-forward command entered on a remote control. If no such command has been received, the process may return to step 401, and the system may continue to display the original content at its normal playback speed.

If, in step 402, a trick play command was received, then the system may proceed in step 403 with displaying the trick mode version of the original content. This may be accomplished, for example, by a head-end transmitting a different stream for the original content, having periodic frames from the content appearing at a different speed corresponding to the trick play command (e.g., a request to view fast-forward 2× speed may result in the trick mode version displaying frames of the original content at twice the frequency of normal speed). That trick mode version may then occupy the screen, replacing the normal speed version from FIG. 3*a*. In the FIG. 3*b* example, the original content may be displayed as a double speed (2×) fast-forward, in response to a fast-forward command. As will be explained below, this trick mode version of the original content may be displayed as a background to alternative content, depending on the position or time within the original content that the trick mode request was made.

Then, in step 404, the system may check to determine what portion of the original content was being viewed at the time the trick play command was entered. This determination may be useful, for example, because the system may wish to permit conventional trick play functionality for some portions of the original content, and may wish to display alternate content for other portions of the original content. For example, if the original content is a recording of a broadcast television program, with the commercials that aired during the original broadcast, the system may only wish to display alternate content if the user attempts to fast forward through the commercials. If the user simply wishes to fast forward through other portions of the original content (e.g., the parts other than commercials), then the system may wish to simply allow the operation, without displaying alternate content. Alternatively, the system may select trick mode content that corresponds to the original content position (e.g., if the user fast forwards through the opening segment of a program, the alternative advertising content may contain promotional information for the program, such as other air times, actor appearances, etc.).

If, in step 404, the trick play command was not entered during an alternate trickplay portion (e.g., the command was not entered during a commercial in a recorded television program), the system may continue to display the trick mode version of the original content, and may proceed to step 405 to determine whether the user has requested to exit the trick play mode. The user may do this, for example, by pressing a "Play" button on the remote control. If the user has not chosen to exit the trick play mode, the process may return to step 403, and the trick play mode version continues to be displayed. If the user has chosen to exit the trick play mode, then the process may return to step 401, and the original content may be displayed once again at normal speed. Of course, these steps may be modified to permit the user to enter additional trick play modes (e.g., going from 2× to 4× speed)—the FIG. 4a process is simply an example.

If, in step 404, the system determines that the trick mode command was received during an alternate trickplay content portion of the original content (e.g., while a commercial was playing from the original content, or for any portion for which an alternate trickplay content is defined), the system may proceed to step 406, and alternate content may be displayed. This alternate content may be any desired type of content that is different from the original content. For example, the alternate content may be an advertisement, separate video program, etc. The alternate content may be still video, motion video, audio, and/or a mix of both audio and video. In addition, the alternate content may be addressable, selected by addressable engine 150 based on one or more factors associated with the client device to which the alternate content is directed.

The FIG. 4a example, in step 406, causes the display of alternate content. FIG. 3b shows one example of how such alternate content may be displayed. As illustrated there, the alternate content 302 may be superimposed over a portion of the original content 301 (which may itself be displayed at the trick play speed, such as 2× fast forward). FIG. 3b shows the alternate content 302 displayed overlaying a central portion of the trickplay version of the original content, but other arrangements may be used (e.g., the alternate content 302 may be displayed as a picture-in-picture window, or at a corner, or in any other desired location and arrangement). The alternate content portion may also be spatially differentiated from the original content using, for example, a linear border, frame, separation lines, gaps, etc.

The alternate content may be opaque, and may obscure portions of the original content 301. Alternatively, the alternate content may be displayed with a predetermined amount of transparency, to allow the original content to remain visible through the alternate content. FIG. 3c illustrates an example in which alternate content 303 is transparent. By allowing the user to view the trickplay version of the original content (e.g., around the outside of the alternate content, and through the alternate content if that content is transparent), the user can still know where they are in the content (e.g. how far into the commercial break they are) and can ensure that he/she can return to normal playback speed at the appropriate time (e.g., when the television program resumes after a commercial break).

During the trick play operation, the various trickplay commands on the user's remote control may be reassigned to allow interaction with the alternate content, or to otherwise have functionality different from its original functionality (e.g., the trick play mode can be analogized to the "ALT" key on a computer keyboard, where alternative functions may be mapped to the keys). In step 407, the system may determine whether the user has entered another trickplay command while the alternate content is being displayed in step 406. In some embodiments, the displayed alternate content may include a prompt to the user, informing the user that one or more of the trickplay commands on the remote control may be used to interact with the alternate content window, and not the trickplay version of the original content being displayed in the background. For example, while the alternate content is displayed 406, the system may re-map the consumer's remote control's trickplay commands to perform some other commands besides trick playing through the original content. So, for example, the consumer pressing the fast-forward button while the original alternate content of step 406 is being displayed may result in displaying a different alternate content (instead of fast-forwarding through the original content), ordering an advertised product, requesting additional information, or any other desired action.

The alternate content may be linear content, such as a short piece of video played in a linear fashion. Or, the alternate content can be non-linear, and may be navigated by the user, displaying different screens in response to user commands (e.g., cursor commands on the remote control, or using re-mapped trickplay commands). In some embodiments, the alternate content may be a user interface, such as an Internet web page or DVD menu, and the various buttons on the remote control may be used to navigate through this alternate content, displaying additional alternate screens as the user interacts with the interface.

If the user has entered such a trick play command during playback of the alternate content of FIG. 3c, the system may proceed to step 408, and act on the re-mapped trickplay command. In the illustrated example, the system may respond to the re-mapped trickplay command (e.g., another fast-forward command) in step 408 by selecting another piece of alternate content for display. That other piece of alternate content may be, for example, another addressable screen advertisement. After selecting the next piece of alternate content, the system may return to step 406, and display that other piece of alternate content. FIG. 3d illustrates an example the next alternate content 304 being displayed, taking the place of the previous alternate content 303, and showing that the original content continues to be played in the initial trick mode (FF×2). Alternatively, the re-mapped trickplay command may also carry its original meaning for purposes of controlling the original content being viewed in the background. So, for example, pressing "Fast-Forward" from the FIG. 3c state may result in advancing the alternate content to the next piece of alternate content, and/or increasing the fast-forward speed of the original content (e.g., making it a FF×3 display). In this manner, the re-mapped trickplay commands may still be used to control the original content while navigating the alternate content. Both Alternate Content 1 in FIG. 3c and Alternate Content 2 in FIG. 3d may be addressable advertisements or other addressable content.

Other commands may also be entered. For example, in step 409, the system may determine whether the user has entered a command (e.g., pressing "Play") to exit the trick play mode. If such a command has been received, the system may return to step 401, and may resume displaying the original content at normal speed. The decision to exit trick play mode may be made based on something other than a user input on a remote control. For example, exiting trick mode in step 409 may occur in response to satisfaction of a predetermined requirement of the alternate content (e.g., displaying for a predetermined period of time, such as 2 seconds, or of the original content reaching a predetermined portion in the program, such as returning from a commercial break). If it is not decided to exit the trickplay mode in step 409, then the system may continue displaying the alternate content in step 406.

It will be understood by those skilled in the related arts that the description above is simplified and, particularly, omits much of the conventional aspects of the overall operation of video delivery over a network. Merely as one example, those skilled in the related arts will understand that during both conventional playback and trick file playback, multiple files may be played sequentially. For instance, as noted in the flow diagram itself, the advertising content and the program content are commonly stored as separate files, and those files are assembled and/or transmitted only at the time of delivery to the consumer.

The features herein may be implemented by suitable software embodied on a computer readable medium such as a DVD-ROM, CD-ROM, solid state memory, floppy disk, magnetic tape, hard drive, etc, and running on a digital processing device, such as a general purpose computer, a microprocessor, a digital signal processor (DSP), etc. Alternately, the features herein may be implemented by other well known techniques and/or apparatus for processing data, including, but not limited to, combinational logic circuits, state machines, application specific integrated circuits (ASICs), field programmable gate arrays (FPGAs), analog circuits, and combinations thereof. Any form of digital memory may be used to store the alternate advertising trick files and other files, including, but not limited to, DVD, CD, solid state memory, floppy disk, hard drive, magnetic tape, etc. All of the components described above (e.g., nodes, servers, and other elements) may be implemented on a computing device having one or more processors configured to execute computer-executable instructions stored in a memory, such as internal RAM, of the computing device to perform the recited functions.

Figure 5:
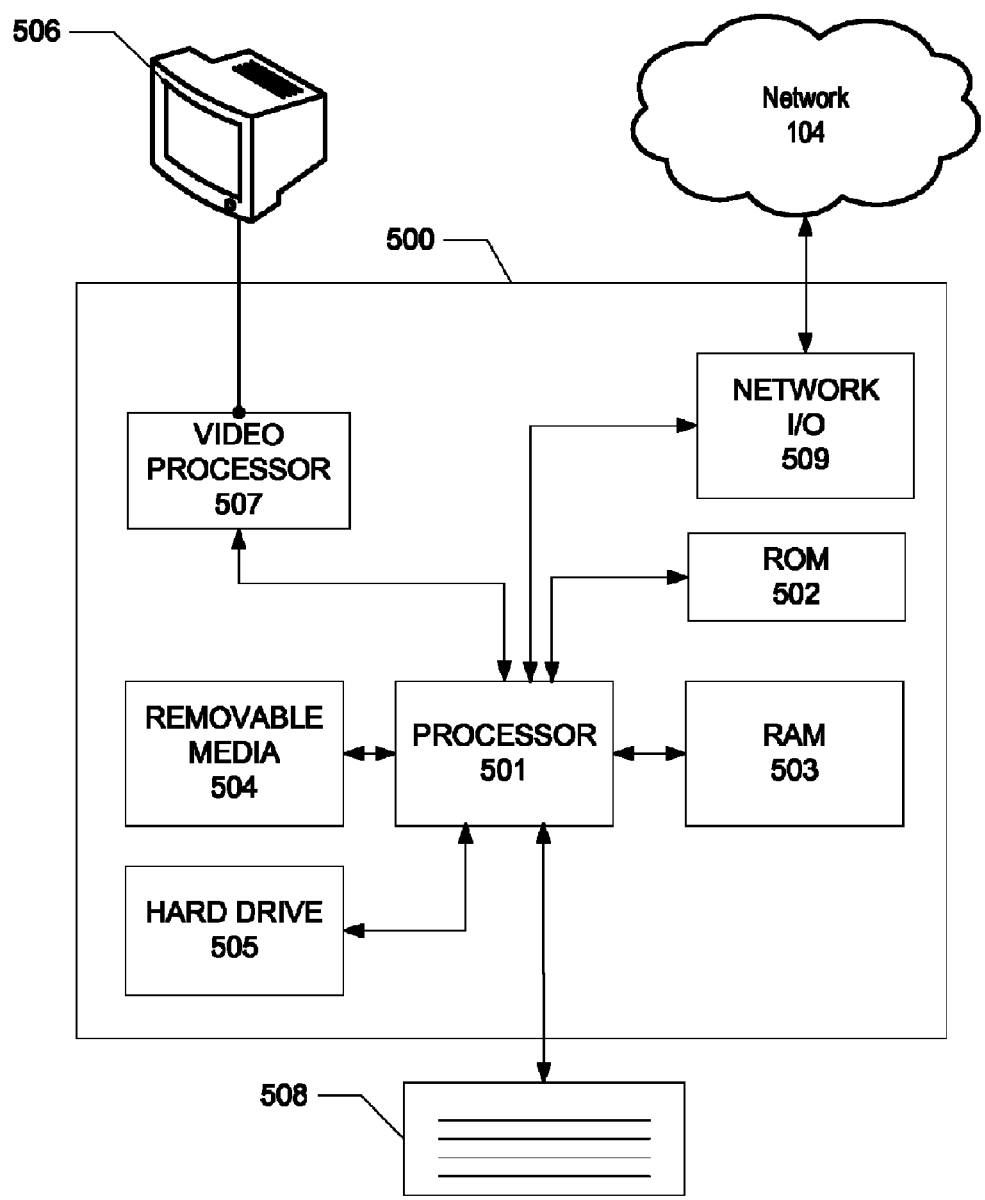
FIG. 5 illustrates example hardware components that may be used to carry out the various features described herein.

FIG. 5 illustrates the general hardware elements of such a computing device 500. The computing device 500 may include one or more processors 501, which may execute instructions of a computer program to perform any of the features described herein. Those instructions may be stored in any type of memory, to configure the operation of the processor 501. For example, instructions may be stored in a read-only memory (ROM) 502, random access memory (RAM) 503, removable media 504, such as a Universal Serial Bus (USB) drive, compact disk (CD) or digital versatile disk (DVD), floppy disk drive, or any other desired electronic storage medium. Instructions may also be stored in an attached hard drive 505. The computing device 500 may include one or more output devices, such as a display 506, and may include one or more output device controllers 507, such as a video processor. There may also be one or more user input devices 508, such as a keyboard, mouse, touch screen, microphone, etc. The computing device 500 may also include one or more network input/output circuits 509, such as a network card to communicate with network 104. The network interface may be a wired interface, wireless interface, or a combination of the two. In some embodiments, the interface 509 may include a cable modem, and network 104 may include a cable television system's coaxial, fiber, or hybrid fiber/coaxial distribution system. In some embodiments, the network caches may be implemented in memory space allocated to the network interface 509.

Another example embodiment is discussed in connection with FIG. 4b, in which multiple levels of alternate content are re-addressable. This embodiment shares steps 401-404, 406, and 407 of the embodiment of FIG. 4a, and will also be discussed with reference to FIGS. 9 and 10, which show additional illustrative embodiments of a system for providing original and alternate content to users.

Figure 4B:
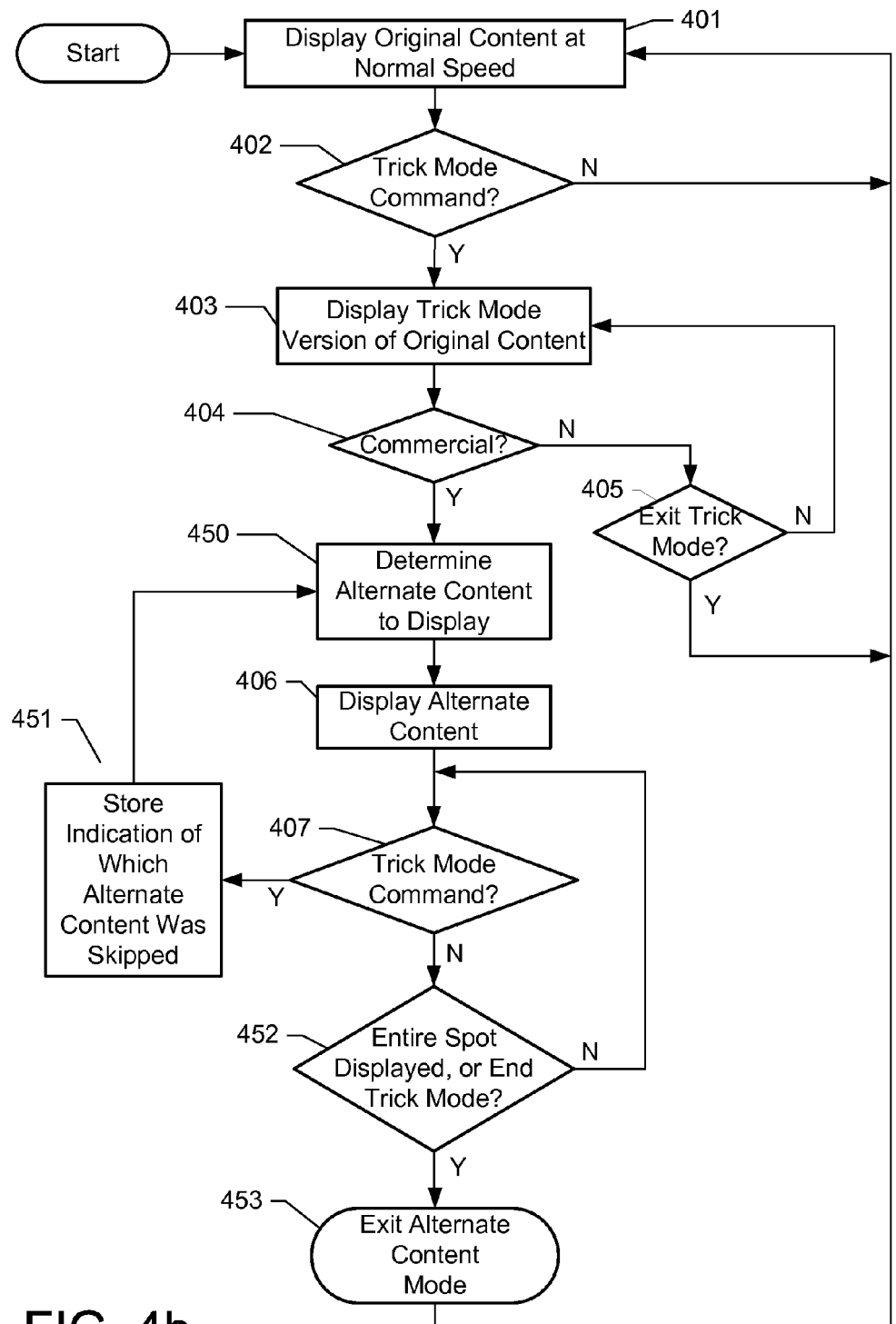

In step 401 of FIG. 4b, the system may begin by providing the primary content stream (via front-end server 106) at normal playback speed to a user at client device 107. This may occur, for example, when the user requests a particular program using a set-top-box, or presses a "Play" button on a DVD player and/or client device 107. The original content displayed to the user from this primary content stream may appear as shown in FIG. 3a, with the original content 301 being displayed at normal playback speed.

In step 402, the system may check to determine whether the user has entered a trick play command. The trick play command may be any request to alter the playback operation of the original content. For example, the trick play command may be a fast-forward command entered on remote control 110. If no such command has been received, the process may return to step 401, and the system may continue to display the original content at its normal playback speed.

Figure 9:
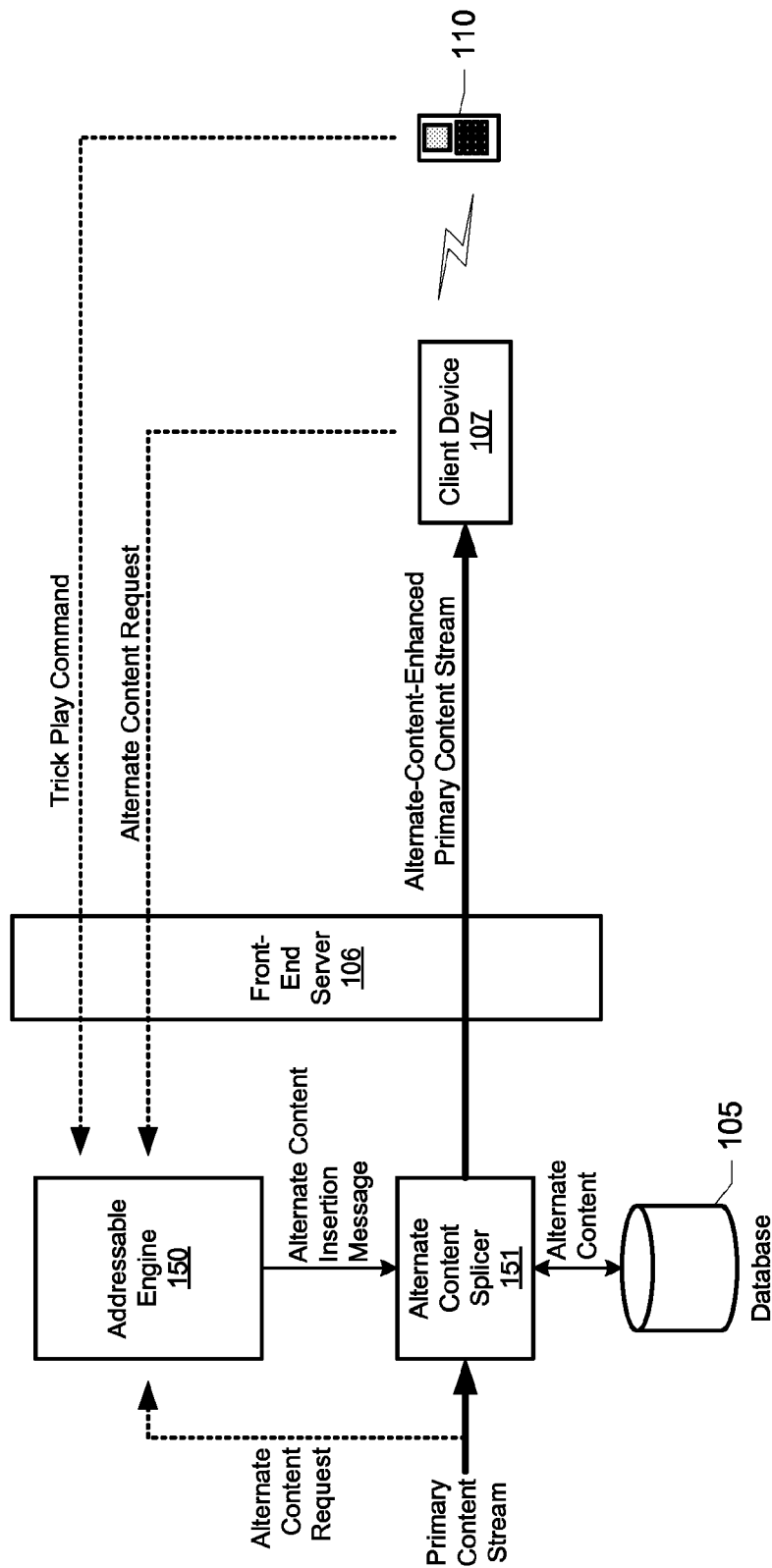
FIG. 9 is a functional block diagram of an illustrative system for providing re-addressable alternate content.

If, in step 402, a trick play command was received (as indicated in FIG. 9 by the "Trick Play Command" path), then the system may proceed to step 403 with displaying the trick mode version of the original content. This may be accomplished, for example, by head-end 102 transmitting a different primary content stream for the original content, having periodic frames from the content appearing at a different speed corresponding to the trick play command (e.g., a request to view fast-forward 2× speed may result in the trick mode version displaying frames of the original content at twice the frequency of normal speed). That trick mode version may then occupy the screen, replacing the normal speed version from FIG. 3a. In the FIG. 3b example, the original content may be displayed as a double speed (2×) fast-forward, in response to a fast-forward command. As previously explained, this trick mode version of the original content may be displayed as a background to alternative content, depending on the position or time within the original content that the trick mode request was made.

Then, as previously explained with regard to step 404, the system may check to determine what portion of the original content was being viewed at the time the trick play command was entered. If, in step 404, the trick play command was not entered during a designated alternate trickplay portion (e.g., the command was not entered during a commercial in a recorded television program), the system may continue to display the trick mode version of the original content, and may proceed to step 405 to determine whether the user has requested to exit the trick play mode.

If, in step 404, the system determines that the trick mode command was received during an alternate trickplay content portion of the original content (e.g., while a commercial was playing from the original content, or for any portion for which an alternate trickplay content is defined), and if the trick mode command is mapped to an action that would skip the present content, then an alternate content request may be made to addressable engine 150. The sensing of the alternate trickplay portion of the primary content stream may be performed by either head end 102 or by client device 107. If performed by client device 107, then the alternate content request may be generated by client device 107 and forwarded to head end 102, such as to addressable engine 150. If performed by head end 102 (such as by front-end server 106 and/or by another server in head end 102), then the alternate content request may be generated by head end 102 and directed to addressable engine 150. Both types of alternate content requests are shown by way of example in FIG. 9.

In response to receiving the alternate content request, the system may proceed to step 450, in which addressable engine 150 determines which alternate content to provide. The determination of which alternate content to display may be based on one or more factors associated with the client device 107 to which the alternate content is directed, such as the demographics of the user of the client device, a history of alternate content that was previously skipped and/or not skipped by the user or by a set of users, and/or the identity of the present content being provided to the recipient. This determination may be different for each recipient or group of recipients. Thus, the alternate content may be addressable to the individual user and/or the set of users to which the alternate content is to be directed.

For example, if the user at client device 107 has a history of skipping a threshold percentage or number (e.g., a majority) of a certain class of alternate content (e.g., automobile advertisements), then in response addressable engine 150 may determine that a non-automobile advertisement should be the alternate content, because yet another automobile advertisement directed to that user would likely be skipped by that user. This history may be stored in a database or other type of log file at the head end 102, such as in database 105. On the other hand, if less than the threshold percentage or number of the certain class of alternate content has been skipped by that user, then this may indicate that the user is interested in that class of alternate content, and so that class of alternate content may more likely be selected as the next alternate content.

Once the alternate content has been determined, the alternate content is extracted from database 105, and the system proceeds to step 406, in which the alternate content is displayed. To display the alternate content, the alternate content is spliced into the primary content stream. This splicing may be performed by alternate content splicer 151 in response to an alternate content insertion message from addressable engine 150 (as shown in FIG. 9). The alternate content insertion message may identify which alternate content in database 105 is to be spliced into the primary content stream. The splicing may be performed in any manner desired to combine the alternate content with the original content and/or to replace the original content with the alternate content. For example, alternate content splicer 151 may add the alternate content such that the resulting content stream received at client device 107 is displayed as shown in FIG. 3*b* or 3*c*.

Next, the user of client device 107 may enter a re-mapped trick play command (as previously described) during playback of the spliced-in alternate content, as determined in step 407. If the re-mapped tick play command indicates that the present alternate content is desired to be skipped by the recipient (e.g., by fast-forwarding through the alternate content), then the system may act on the re-mapped trickplay command by proceeding to step 451. By doing so, the recipient user has effectively indicated that yet another alternate content placement opportunity is now available.

In step 451, the system may store in the above-described log file of database 105 an identification of the content (in this case, alternate content) that was being provided at the time of the re-mapped trick play command, and/or an indication that the content was skipped by the user. The log file may also associate the identity of the user and/or client device 107, and/or an indication of the time and/or date that the skipping occurred.

The system then proceeds to step 450, in which a new alternate content item is determined to replace the existing alternate content. Again, this new alternate content may be selected based upon the content of the above-mentioned log file in database 105, and identity of the currently-presented alternate content, and/or one or more demographic characteristics of the recipient. The system then proceeds, as already described, to step 406, in which the currently-displayed alternate content is replaced with a new alternate content, such as shown in FIG. 3*d*. This replacement of alternate content with newly-determined alternate content in the loop of steps 450, 406, 407, and 451 may be repeated multiple times (e.g., third alternate addressable content, fourth alternate addressable content, etc.) during a single alternate trickplay content portion of the primary content stream. Therefore, it is possible to have multiple addressable (re-addressable) alternate content within the same alternate trickplay content portion, each replacing the previous addressable alternate content in response to a user command indicating a desire to skip the presently playing alternate addressable content.

The remainder of the process may operate substantially similarly to the process of FIG. 4*a*. In FIG. 4*b*, if no additional trick mode command is issued in step 407, then the process moves to step 452, in which head end 102 determines whether the entire alternate content spot is displayed. This may involve determining whether the current alternate content is completed and/or whether the current alternate trickplay content portion of the primary content stream has ended. If not, then the process moves back to step 407. If so, then the process moves to step 453, in which the alternate content is exited and the original primary content stream is again provided in step 401.

The system of FIG. 9 is arranged such that addressable alternate content is selected and spliced into the primary content stream at the head end 102. However, the process of FIG. 4*b* may alternatively be performed in connection with the illustrative system shown in FIG. 10. In this system, addressable alternate content is spliced at the client side, such as by client device 107. The addressable alternate content in this embodiment may also be selected at the client side, such as by client device 107, or at head end 102.

Figure 10:
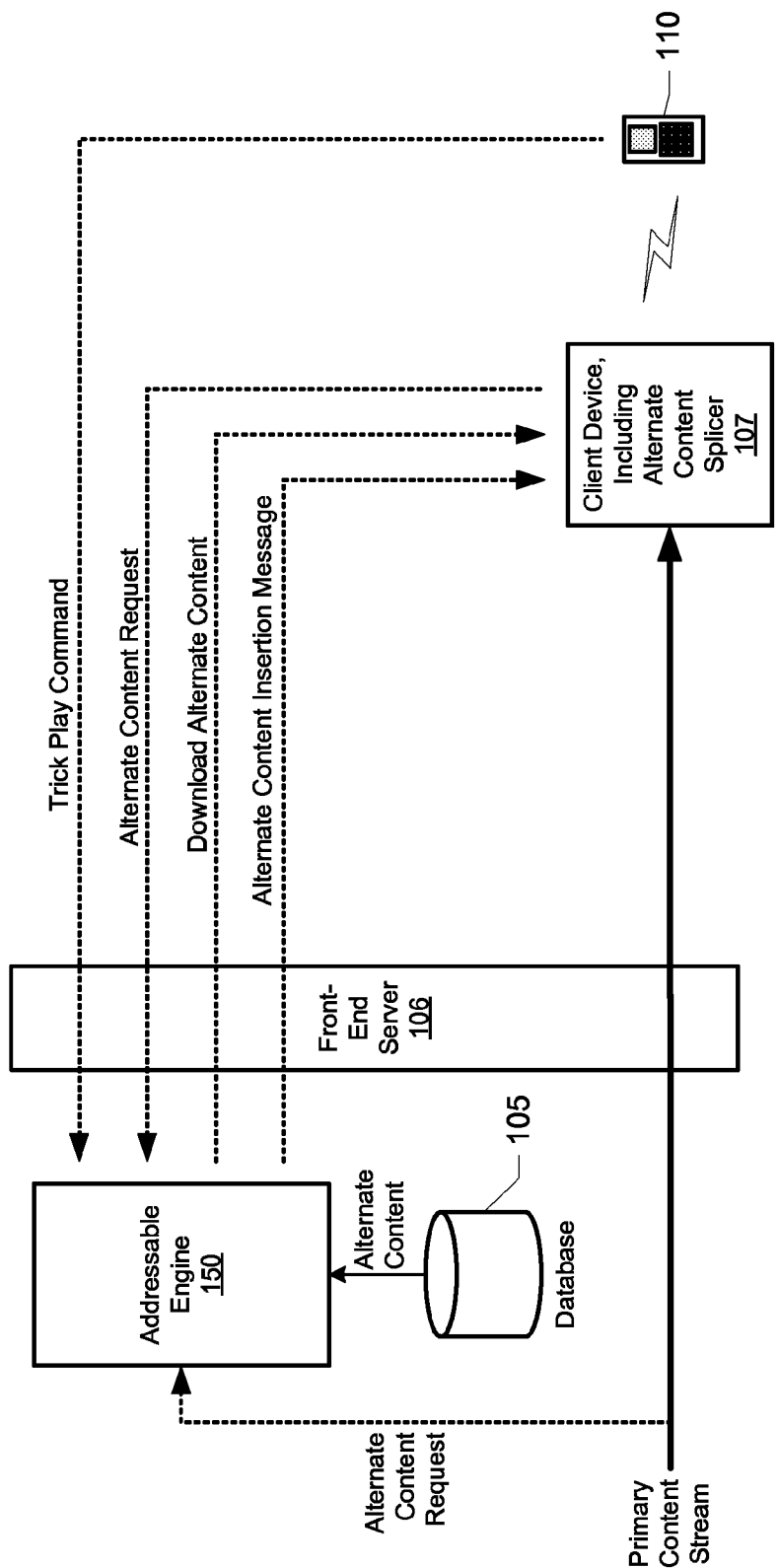
FIG. 10 is a functional block diagram of another illustrative system for providing re-addressable alternate content.

In the embodiment of FIG. 10, alternate content may be downloaded from database 105 to client device 107 for storage locally accessible by client device 107. This alternate content may be stored in, e.g., hard drive 505 and/or RAM 503 of client device 107. The system of FIG. 10 would perform the method of FIG. 4*b* in a similar manner as the system of FIG. 9, except with the following differences. First, the determination of which alternate content to insert (step 450) may be performed by client device 107 rather than by addressable engine 150. In fact, client device 107 may include its own addressable engine functionality to perform this determination. The addressable engine in client device 107 may be performed, for example, by processor 501 executing software stored in RAM 503.

A second difference between the embodiments of FIGS. 9 and 10 is that, in FIG. 10, the alternate content may be spliced into the primary content stream at the client side, such as by client device 107. Thus, client device 107 may itself include splicing functionality. The splicing function in client device 107 may be performed, for example, by processor 501 executing software stored in RAM 503.

Figure 6:
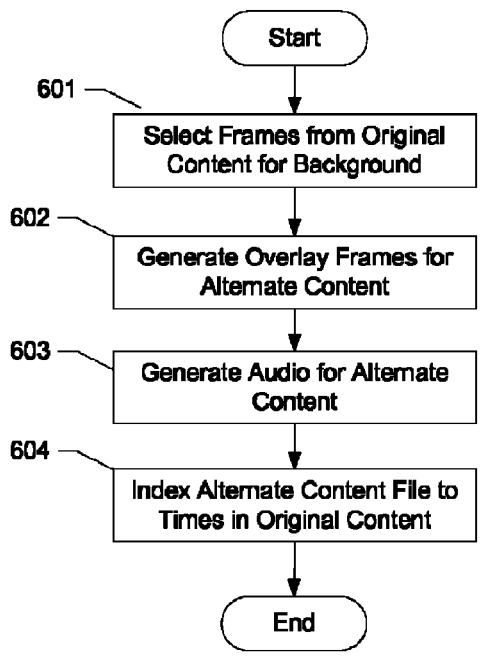
FIG. 6 illustrates an example process of generating and indexing trick mode content.

As noted above, there are several approaches to generating trick play content. The alternate content may also be generated in a variety of ways. For example, a "file based" approach may involve generating a separate file that is streamed or played when the user selects the trickplay operation. FIG. 6 illustrates an example method for the file based approach.

First, in step 601, selected frames from the original content may be chosen for the fast-forward effect that will appear in the background. For example, a normal two minute break has 3600 frames of video. To run the break in the 20 seconds that simulate a fast-forward mode, the original 3600 frames of advertising may be cut to 600 frames of video. This decrease in frames is suitable since the background video will only be utilized to track original programming. Step 601 may extract every $6^{th}$ frame of the original content, to assemble the 600 frames of the fast-forward version. The present example assumes this 1/6th ratio between the original break length and the trick mode break length, but no such ratio is required. For example, the duration of the alternate content may be independent of the original break, and need not be a predetermined limited time. For example, the user could navigate through many pieces of alternate content, and as long as the user is actively engaged with the alternate content (e.g., pressing a trick mode key once every 5 seconds), the system may allow the alternate content to be continuously displayed. The original content may be displayed in the background at the trick mode speed, but when it is ready to resume the normal display, it may simply be paused in the background to await the user's exiting of the alternate trick mode display.

As another example, a 30-second spot encoded as an MPEG-2 transport stream may have a long GOP (group of pictures) set to 15, with 30 frames per second, resulting in a total of 900 frames. Bookending the advertisement with 12 frames of black (to allow smoother viewer transition) results in a total of 912 frames for the original content advertisement.

Figure 7:
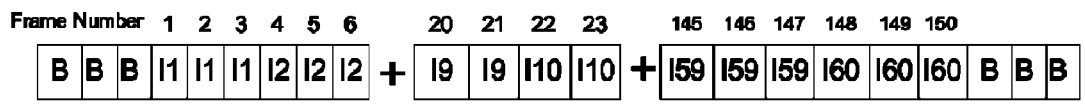
FIGS. 7 and 8 illustrate example alternate trick mode details.

Based on the specifications above, approximately 60 I-frames would be extracted from thirty seconds of video. In the FIG. 7 illustration of this example, the I-frames are put into buckets labeled "IF to 160." Creating a five second trick-file ad will require a total of 150 frames of video (5 seconds*30 frames/second). If each bucket is filled by replicating I-frames within the bucket, after one iteration a total of 120 frames would be accumulated in the sixty buckets. This would result in a trick-file of approximately 120 frames, thirty frames short of the 150-frame objective. The next step would be to replicate I-Frames in thirty random, or other fashion, buckets in order to achieve our target of 150 frames of video. Finally, bookends are added to the file to provide optional frames of black for smooth video transition. As all black frames are equivalent, they are collectively referred to as "B" in FIG. 7. This process results in having the original 912 frames of video reduced to 156 frames of video that will run in five seconds. This new file may then be used to provide the background video of the original spot running in fast forward mode.

Figure 8:
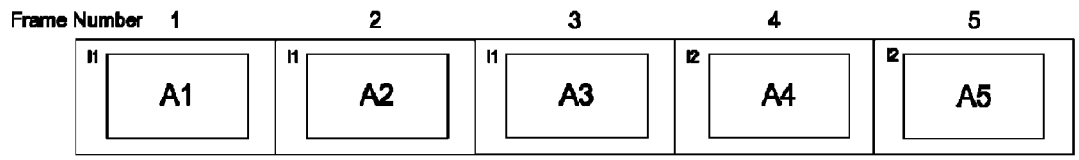

Then, in step 602, the replacement content may be added as an overlay on the original content. As noted above, the overlay may be delineated using a border, such as a black line. Following the example above, the replacement content may need to be exactly 150-frames, to correspond to the fast-forwarding original content. For example, these frames may be labeled "A1" through "A150," as illustrated in FIG. 8. Each of these I-Frames may have dimensions slightly smaller than the I-Frames from the trick-file background video. The FIG. 8 diagram is representative of the first five frames in the newly assembled trick-file advertisement.

Once the video has been correctly assembled, the next step 603 may be to add the audio track. Then, the newly created elementary stream may be wrapped with an MPEG-2 transport stream component. Now it is ready for distribution to VOD pumps, DVRs, or other CE devices. This algorithm can be adapted to support a wide range of durations.

Then, in step 604, the alternate content may be indexed with the corresponding positions within the original content. For example, an index for the original content may identify times during which a fast-forward command will result in the display of alternate content. One index entry may indicate that, for a commercial break appearing between the 12- and 14-minute marks of a program, a fast-forward request is to result in playing "alternate content A." These steps may be repeated as often as desired, depending on the amount of alternate content to be associated with a given piece of original content.

The description of the "file-based" method above is just one way in which the alternate trick play content may be generated. Another approach may involve performing the process dynamically, in response to a trick play request, to dynamically generate the new trick play content (e.g., background original content with foreground alternate content). This dynamic assembly may be performed by a VOD video pump, which may dynamically generate and insert the necessary alternate trick play content.

Additionally, the alternate trick play content files may be supplied to subscriber units (e.g., their DVRs), and those units may be configured with executable software to generate and/or display the necessary alternate content at the appropriate time. In some embodiments, no separate trick files need to be generated at all. For example, if the user's set-top-box includes picture-in-picture capability, the headend 102 may simply transmit an instruction to the client device 107, informing the client device of the new trick play mode and identifying the location (e.g., another data stream, an Internet location, a stored location within the client device memory, etc.) for the alternate content, and the client device 107 may dynamically generate the trickplay version of the original content, and superimpose the alternate content as described above.

As another feature, the capabilities of trick file advertising can incorporate a number of advanced features in a two-way operating environment. For example, trick modes may be captured as state changes on the VOD platform and then mapped to specific functionality. For example, a computer at the headend 102, or the client device 107, may maintain state information identifying the viewer's current viewing state (e.g., watching NBC live, paused, etc.), and each state may be associated with predefined functionality (e.g., displaying alternate content, displaying trick mode versions of content, etc.). This type of state machine will allow for the creation of a contest that is embedded within the content. One type of contest could be an Easter egg hunt, where video widgets may be placed across the span of content and accumulated into a basket, much like a shopping cart on the web. Each of these interactions would be captured and persisted. Once the consumer has interacted with all of the specified widgets they would be notified of contest results. Such contests may also require certain user inputs, such as entering a predetermined sequence of trick play commands after the alternate trick play content has begun (e.g., pressing "fast-forward" twice and "rewind" once).

Having thus described a few particular embodiments, various alterations, modifications, and improvements will readily occur to those skilled in the related arts. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. This patent is limited only as defined in the following claims and equivalents thereto.

The invention claimed is:

1. A method, comprising:
providing first video content for standard playback to a user;
receiving a first user request for a first trick mode operation during the standard playback of the first video content;
responsive to the first user request, providing addressable second video content, different from the first video content, to the user;

receiving, during providing of the addressable second video content, a second user request for a second trick mode operation on the addressable second video content;

responsive to the second user request, providing addressable third video content, different from the first and second video contents, to the user;

determining the addressable third video content based on both the first content and the addressable second video content;

identifying a predetermined sequence of re-mapped trick mode commands corresponding to a sequence of alternative content; and identifying a reward to be granted to the user if the user successfully enters a predetermined sequence of a plurality of different re-mapped trick mode commands to view the sequence of alternative content, wherein the re-mapped trick mode commands convert trick mode commands into commands to navigate through a plurality of different alternative content.

2. The method of claim 1, wherein the first video content is a video program, and the second video content and third video content each comprises advertising.

3. The method of claim 1, wherein the second video content comprises instructions to the user regarding re-mapping of one or more trick mode commands to a request for the third video content.

4. The method of claim 1, further comprising determining the third video content based on a stored history of video content that was previously skipped by a recipient of the first video content.

5. The method of claim 1, further comprising determining the third video content based on a demographic characteristic of a recipient of the first video content.

6. The method of claim 1, further comprising:
displaying a trick mode version of the first video content in a background while displaying the third content in a foreground, wherein the first video content is a commercial break of a video program;
determining whether the user is actively engaged with the third content at a time when the trick mode presentation of the commercial break has reached an end of the commercial break; and
in response to determining that the user is actively engaged with the third content at the time when the trick mode presentation of the commercial break has reached the end of the commercial break, replacing the trick mode presentation of the commercial break with a paused image.

7. The method of claim 6, wherein determining whether the user is actively engaged with the third content comprises measuring an elapsed time from entry of a command.

8. A non-transitory computer-readable medium storing computer-executable instructions for performing a method, the method comprising:
providing first video content for standard playback to a user;
receiving a first user request for a first trick mode operation during the standard playback of the first video content;
responsive to the first user request, providing addressable second video content, different from the first video content, to the user;
receiving, during providing of the addressable second video content, a second user request for a second trick mode operation on the addressable second video content;

responsive to the second user request, providing addressable third video content, different from the first and second video contents, to the user, wherein the second video content comprises instructions to the user regarding re-mapping of one or more trick mode commands to a request for the third video content, wherein the re-mapping of one or more trick mode commands converts fast forward and rewind trick mode commands into commands to navigate through a plurality of different alternative content;

identifying a predetermined sequence of re-mapped trick mode commands corresponding to a sequence of alternative content; and identifying a reward to be granted to the user if the user successfully enters the predetermined sequence of a plurality of different re-mapped trick mode commands to view the sequence of alternative content.

9. The non-transitory computer-readable medium of claim 8, wherein the method further comprises determining the addressable third video content based on both the first content and the addressable second video content.

10. The non-transitory computer-readable medium of claim 8, wherein the first video content is a video program, and the second video content and third video content each comprises advertising.

11. The non-transitory computer-readable medium of claim 8, further comprising determining the third video content based on a stored history of video content that was previously skipped by a recipient of the first video content.

12. The non-transitory computer-readable medium of claim 8, further comprising determining the third video content based on a demographic characteristic of a recipient of the first video content.

13. The non-transitory computer-readable medium of claim 8, the method further comprising:
responding to a single remapped trick mode command with two events, a first event being a change in the presentation rate of a background display of the first video content, and a second event being a display of a different alternate content in a foreground display.

14. A non-transitory computer-readable medium storing computer-executable instructions for performing a method, the method comprising:
responsive to a first request received while first video content is being provided in a data stream, splicing second video content, different from the first video content, into the data stream;
responsive to a second request received while the second video content is being provided in the data stream, determining third video content, different from the first and second video contents, based on a stored history of video content that was previously skipped by a recipient of the data stream, identifying a predetermined sequence of re-mapped trick mode commands corresponding to a sequence of alternative content, and identifying a prize to be granted to the recipient if the recipient successfully enters a predetermined sequence of a plurality of different re-mapped trick mode commands to view the sequence of alternative content, wherein the re-mapped trick mode commands convert trick mode commands into commands to navigate through a plurality of different alternative content; and
splicing the third video content into the data stream.

15. The non-transitory computer-readable medium of claim 14, the method further comprising:
   determining a class of the first video content;
   determining a percentage or number of times that the recipient has previously requested to skip past content in the same class as the first video content; and
   selecting the second video content based on the percentage or number.

16. The non-transitory computer-readable medium of claim 15, the method further comprising:
   selecting the second video content to be in the same class as the first video content in response to determining that the percentage or number is below a predetermined threshold percentage or number.

17. The non-transitory computer-readable medium of claim 15, the method further comprising:
   selecting the second video content to be in a different class from the first video content in response to determining that the percentage or number exceeds a predetermined threshold percentage or number.

18. The non-transitory computer-readable medium of claim 14, further storing instructions to:
   determine whether a request for trick mode operation was received during a non-advertising portion of a video program; and
   limit the display of an overlay of alternate advertising to times when the request for trick mode operation was received during an advertising portion of a video program.

* * * * *

UNITED STATES PATENT AND TRADEMARK OFFICE
CERTIFICATE OF CORRECTION

| | |
|---|---|
| PATENT NO. | : 8,307,390 B2 |
| APPLICATION NO. | : 12/862716 |
| DATED | : November 6, 2012 |
| INVENTOR(S) | : Dan Holden |

It is certified that error appears in the above-identified patent and that said Letters Patent is hereby corrected as shown below:

In the Specification

Column 17, Line 23:
Please delete "IF to 160." and replace with -- "I1" to "I60." --

Signed and Sealed this
Twenty-fourth Day of September, 2013

Teresa Stanek Rea
*Deputy Director of the United States Patent and Trademark Office*